June 30, 1953 M. J. HOYKA 2,643,634

SOUND DEADENER FOR SIGNALING DEVICES

Filed March 3, 1952

Witness
Edward P. Seeley

Inventor
Marion Joseph Hoyka
by M. Talbert Dick
Attorney

Patented June 30, 1953

2,643,634

UNITED STATES PATENT OFFICE 2,643,634

SOUND DEADENER FOR SIGNALING DEVICES

Marion Joseph Hoyka, West Des Moines, Iowa

Application March 3, 1952, Serial No. 274,641

5 Claims. (Cl. 116—149)

My invention relates to means for controlling the intensity of signals such as those produced by telephone bells and the like.

The telephone bell for illustration is capable of producing a very shrill signal and for many reasons too numerous to mention, it is frequently desirable to muffle the sound or even to completely eliminate it at times. Various devices have been made for muffling the telephone bell and these have usually consisted of some means for engaging the bell such as rubber or the like and in general these muffling devices require mounting by screws or the like on or within the telephone casing.

It is therefore the general aim of my invention to provide a sound deadening means for signalling devices such as telephone bells that is not secured to the telephone by screws, bolts or the like and can quickly and easily be placed in operable or inoperable position without the use of any tools.

A further object of this invention is to provide a telephone bell muffler of the above class that will regulate the sound of the bell to any degree of intensity including completely eliminating the sound if desired.

A still further object of my invention is to provide a muffler for audible signal means as described that can be used on telephones designed for use on flat surfaces or secured to a wall.

Still another object of my invention is to produce a sound deadener for telephone bells that can be left either mounted on the telephone or removed when not in use, and which does not interfere with the normal operation of the telephone.

Still further objects of this invention are to provide a telephone bell muffler having the above stated characteristics which is economical in manufacture, refined in appearance, and efficient in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Figure 2:
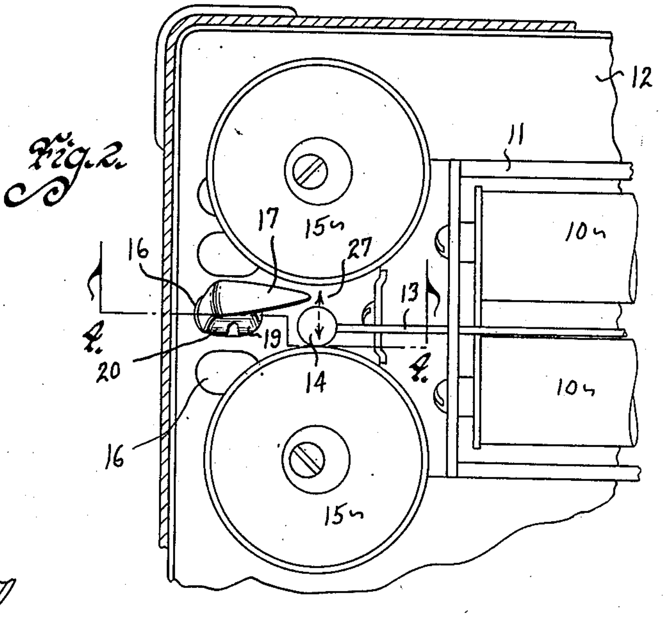
Fig. 2 is a fragmentary plan view of the bell portion of a telephone signal unit showing my invention in one position of operability.

Referring to the drawings, a portion of the bell signal structure of an ordinary table type telephone is shown in Fig. 2 to illustrate the use of my invention. A pair of coils 10 are mounted in a frame 11 that is secured to a metallic base member 12 upon which is mounted a suitable housing 12*a*. A rod member 13 has a clapper 14 secured to one end and at its other end (not shown) is operatively secured to the coils 10 which when energized causes the rod to vibrate and the clapper to alternately sound the bells 15. The bells are usually eccentrically mounted as shown in Fig. 2 and thus by their individual rotation the intensity of the bell sound can be controlled within certain limits.

Figure 3:
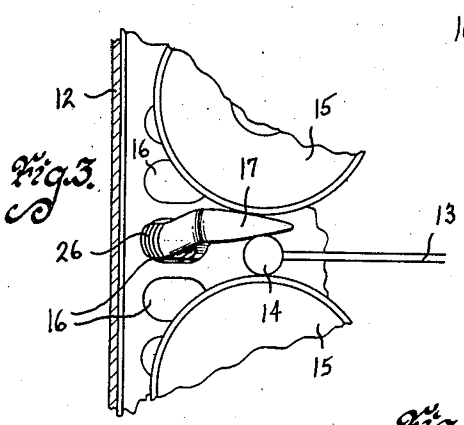
Fig. 3 is a small fragmentary view similar to portions of Fig. 2 showing my invention in another operable position designed to eliminate the bell sound.
Figure 4:
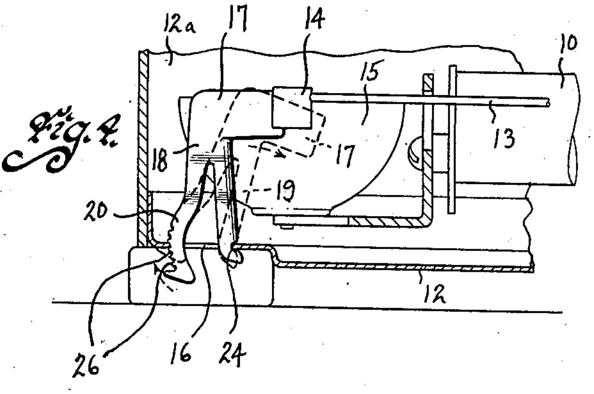
Fig. 4 is a cross-sectional view taken on the line 4—4 of Fig. 2.

In the base member 12 of each telephone unit will be found a plurality of oval openings 16 as shown in Figs. 2 and 3. These are arranged in a line near the bells which is substantially parallel to a line connecting the axes of the bells. Since the bells are enclosed in the signal unit, these openings serve the obvious purpose of permitting the bell sound to escape. The structure thus far described is commonplace in telephone substations and embodies old and well known signalling means.

My invention embodies the use of a wedge means that can be passed through one of the openings 16 to limit or eliminate the movement of the clapper 14 between the bells 15 as I will now describe.

Figure 1:
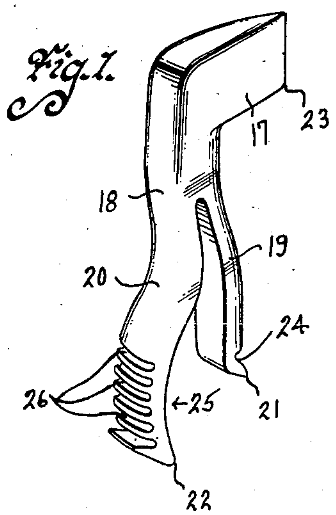
Fig. 1 is a perspective view of my invention of the type used for table model telephones.

Fig. 1 embodies one form of my invention and comprises the wedge head 17, neck 18 and forked legs 19 and 20 all integrally formed. Preferably I use a resilient material such as plastic or the like so that the legs can be yieldingly moved towards each other but will normally tend to move away from each other toward their spaced apart position. At the lower portion of the neck 18 the legs define a slight S-curve laterally so that if vertical lines are drawn to bisect the points 21, 22 and 23 in Fig. 1 (21, 22 and 28 in Fig. 5), the points 21 and 22 will be in one vertical plane laterally spaced from that of point 23 or 28. This slight off-set can be observed in Fig. 3 and will be more fully explained later.

Figure 5:
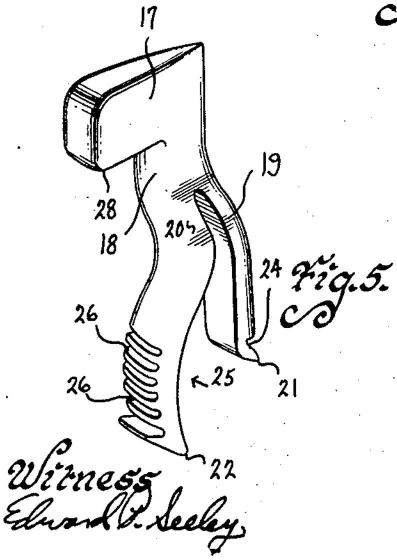
Fig. 5 is a perspective view of a modified form of my invention for use on wall mounted telephones.

The leg 19 is shorter in length than the leg 20 and is provided at its free bottom end with the notch 24. The lower portion of the leg 20 is bulged or curved outwardly away from leg 19 as at 25 and on its outer sides has a plurality of parallel spaced apart notches 26 arranged transversely of the longitudinal axis thereof. In Fig. 1 it is pointed out that the wedge end of the head 17 extends forwardly from the leg 19 at substantially right angles thereto in much the same manner as an axe head extends away from its handle. In Fig. 5 which is a slight variation of my invention and which contains like elements as these described for Fig. 1, the wide end of the head 17 extends rearwardly from leg 20 at substantially right angles. In both Fig. 1 and Fig. 5 it is to be observed that the head 17 is positioned with the wedge edge in the same direction, though in the separate embodiments their relationship to the neck 18 and legs 19 and 20 is varied as illustrated.

Thus constructed and arranged, my new invention will operate in the following manner. In the table model telephone, it is preferably inverted so that the bottom of the base member 12 is up and the row of openings 16 runs horizontally at the upper portion thereof. In this position it will be found that one of the openings 16, such as the second one up in Fig. 2 will be opposite a point substantially midway on the shortest line drawn between the closest adjacent points of the bells 15. My invention is then grasped by the legs 19 and 20 between the thumb and index finger and squeezing the legs together. The wedge end of the head 17 is then inserted into the selected opening 16 until the notch 24 and one of the notches 26 are engaged in opposite edges of the opening 16. As this is done the wedge head 17 will enter the space 27 between the upper bell 15 in Fig. 2 and the clapper 14. It is observed that this space 27 is slightly off-set from a straight horizontal line bisecting the selected opening 16 in Fig. 2 and thus in order for the wedge head to enter the space 27 the modified slight S formation hereinabove described is provided. In Fig. 2 the position of the wedge 17 is shown when the notch 24 and the uppermost of the notches 26 are engaging the selected opening 16. This will muffle the sound of the bell only slightly as the clapper is still permitted considerable movement. To further muffle the sound of the bell or to decrease its intensity, the leg 20 is pushed inwardly so as to engage other of the notches 26. Since leg 20 is longer than leg 19, as a progressively lower notch 26 is used, the farther the wedge enters the space 27 until it is possible by using the lowest of the notches 26 to wedge the clapper tightly against any movement as shown in Fig. 3. It is pointed out that by providing the curved portion 25 on the leg 20 the frictional engagement of the legs on the sides of the opening is maintained irrespective of which notch 26 is used. As the wedge head moves farther into the space 27 its movement defines a slight arc and consequently the curved portion 25 compensates for this at the other end.

In a telephone sub-station unit such as is partially shown in Fig. 2, the clapper, when inoperable, normally rests against one of the bells 15 as shown. However, should it be midway between them or even closer to the other, my wedge head 17 will still operate as described. When initially inserting the wedge into the selected opening 16, it may be found that a thin screen-like covering is secured over the openings from the inside. If this is encountered, it is pointed out that it can be easily moved aside without in any manner damaging or interfering with the operability of the telephone unit.

The modified structure of my invention as illustrated in Fig. 5 is adapted especially for use in telephones of the type that are wall mounted. Such wall sub-stations have the same type signalling device as I have illustrated but I have found that due to the positions of the openings in the wall box casing that if the form of my invention shown in Fig. 1 is used, the engagement of the uppermost notch 26 will effectively wedge the clapper against any movement. Consequently, to accomplish the graduated control for the bell intensity on wall type telephones, I have varied by wedge as in Fig. 5. The manner of use of this modified wedge is the same as described for that shown in Fig. 1.

While I have illustrated a bell signal unit for a telephone for purposes of describing my invention, it is to be observed that there are signal means such as buzzers and the like that operate on the principle of a vibrating member upon which my invention can be successfully used as I have pointed out above.

Some changes may be made in the construction and arrangement of my sound deadener for a signalling device without departing from the real spirit and purpose of my invention, and it is my intention to cover by my claims, any modified forms of structure or use of mechanical equivalents which may be reasonably included within their scope.

I claim:

1. In a sound deadening device for a housed signal unit having a pair of bells, a clapper for sounding the bells and an opening in said housing, a wedge head member having two forked resilient legs, said wedge head member insertable through said opening so as to wedge between said clapper and one of said bells, and said forked legs frictionally engaging the edge of said opening to hold said wedge in its wedged position.

2. In a sound deadening device for a housed signal unit having a pair of bells, a clapper for sounding the bells and an opening in said housing, a wedge head member having two forked resilient legs, said wedge head member insertable through said opening so as to wedge between said clapper and one of said bells, and said forked legs frictionally engaging the edges of said opening to hold said wedge head in its wedged position, and means for progressively increasing the wedge action of said wedge head whereby the intensity of the bell sound produced by the clapped can be selectively controlled.

3. In a sound deadening device for a housed signal unit having a pair of bells, a clapper for sounding the bells and an opening in said housing, a wedge head member having two forked resilient legs of unequal length, a notch at the free end portion of said shorter leg, a plurality of notches on the free end portion of said longer leg, said last mentioned notches being substantially parallel to each other in spaced relationship and transversely of the longitudinal axis of said longer leg, said wedge head member insertable through said opening so as to wedge between said clapper and one of said bells, the notch on said shorter leg frictionally engaging one side of said opening and one of the notches on said longer leg engaging the opposite edge of said opening to hold said wedge head in its wedged position.

4. In a sound deadening device for a housed signal unit having a pair of bells, a clapper for sounding the bells and an opening in said housing, a wedge head member having two forked resilient legs of unequal length, a notch at the free end portion of said shorter leg, a plurality of notches on the free end portion of said longer leg, said last mentioned notches being substantially parallel to each other in spaced relationship and transversely of the longitudinal axis of said longer leg, said wedge head member insertable through said opening so as to wedge between said clapper and one of said bells, the notch on said shorter leg frictionally engaging one side of said opening and one of the notches on said longer leg engaging the opposite edge of said opening to hold said wedge head in its wedged position, and the selective engagement of different of said notches on said longer leg with the edge of said opening causing the intensity of the bell sound to be decreased or increased by increasing or decreasing the tightness of the wedge action of said wedge head between said clapper and one of said bells.

5. In a sound deadening device for a housed signal unit having a pair of bells, a clapper for sounding the bells and an opening in said housing, a wedge head member having two forked resilient legs of unequal length, the free end portion of said longer leg curved outwardly away from said shorter leg, a notch at the free end portion of said shorter leg on the outer side thereof, a plurality of notches on the outer side of the curved portion of said longer leg, said last mentioned notches being substantially parallel to each other in spaced relationship and transversely of the longitudinal axis of said longer leg, said wedge head member insertable through said opening so as to wedge between said clapper and one of said bells, the notch on said shorter leg frictionally engaging one side of said opening and one of the notches on said longer leg engaging the opposite edge of said opening to hold said wedge head in its wedged position.

MARION JOSEPH HOYKA.

References Cited in the file of this patent

UNITED STATES PATENTS

| Number | Name | Date |
|---|---|---|
| 2,324,696 | Hannaford | July 20, 1943 |